United States Patent [19]
Dietrich

[11] Patent Number: 4,797,562
[45] Date of Patent: Jan. 10, 1989

[54] IMAGE RECORDING SENSOR

[75] Inventor: Klaus Dietrich, Gochsheim, Fed. Rep. of Germany

[73] Assignee: Messerschmitt-Bölkow-Blohm GmbH, Munich, Fed. Rep. of Germany

[21] Appl. No.: 109,185

[22] Filed: Oct. 15, 1987

[30] Foreign Application Priority Data

Oct. 21, 1986 [DE] Fed. Rep. of Germany ....... 3635687

[51] Int. Cl.$^4$ .............................................. H01J 40/14
[52] U.S. Cl. ................................. 250/578; 358/213.27
[58] Field of Search ................... 250/578; 358/213.11, 358/213.15, 213.16, 213.27

[56] References Cited

U.S. PATENT DOCUMENTS 4,505,574 3/1985 Kurata et al. ........................ 250/578
4,638,354 1/1987 Denimal .......................... 358/213.11

Primary Examiner—David C. Nelms
Assistant Examiner—Khaled Shami
Attorney, Agent, or Firm—Kenyon & Kenyon

[57] ABSTRACT

The invention relates to an image recording sensor (1) with a plurality of photodetectors (15) in a matrix arrangement. The photodetectors (15) are here integrated components of cells (2), which through address lines (PX, PY) can be coupled for the definition of cell addresses. Each cell has at least one capacitor (C1, C2), in which the photocharge of the photodetector (15) can be stored. The resulting capacitor voltage (U1) is compared in a comparator (17) with a reference voltage ($U_{REF}$, U2). The comparator is succeeded by an output circuit (18) for the output of a signal to the address lines upon the occurrence of a positive comparison result. All cells (2) can be driven via an external control circuit (4) with groups of common control and check signals. With such image recording sensor (1) no intensity values per picture element are output but only the addresses of the picture elements of interest, in which the intensity value has exceeded a given level, i.e., the intensity equivalent of the reference voltage ($U_{REF}$, U2).

9 Claims, 3 Drawing Sheets

IMAGE RECORDING SENSOR

BACKGROUND AND SUMMARY OF THE INVENTION

The invention relates to an image recording sensor which comprises a preselected line-shaped pattern of photodetectors for recording an image, the photodetectors being coupled to an image processing circuit. Such one or two-dimensional photodetector arrays are, for example, integrated circuits of charge-coupled memories.

These image recording sensors find application in image generation, image reproduction or image processing, for object recognition, and/or object tracking as well as for target recognition. For object recognition and/or object tracking, the image recording sensor is succeeded by an image processing circuit, in order to recognize a selected object on the basis of its form in the image.

In target recognition, the target to be recognized is in many cases, for example, a light-tagged missile unambiguously emphasized by its intensity against all other image elements.

In known image recording sensors, the discrete photodetectors corresponding to the pixels (picture elements) of the sensor are read sequentially and then digitally processed in order to carry out an object position determination or a target recognition.

In the addressed problem of target recognition, as a rule, the total image recorded by the image recording sensor is not of interest. Rather, what is essential for target recognition are only the coordinates of the picture element associated with the target. The process applied until now, i.e., to read the total image from the image recording sensor and allow it to be processed by an image processing circuit in order to find these coordinates, is, therefore, cumbersome and slow. A more rapid target recognition and target tracking is in many cases, desirable.

The invention is based on the task of providing an image recording sensor of the kind under discussion, with which significantly faster and more economical operation is achieved and wherein objects and/or targets can be recognized and their picture element coordinates unmistakably given.

Pursuant to the invention, an image recording sensor comprises a preselected line-shaped pattern of photodetectors for recording an image. The photodetectors are coupled to an image processing circuit wherein at least one part of the image processing circuit is integrated in the image recording sensor. To this end, the image recording sensor comprises a plurality of discrete cells, each of which is assigned to a predetermined one of the photodetectors. The cells are each coupled via column and row lines to encoder/decoder circuits for generating address information for a particular cell under certain conditions, as will appear. Moreover, each cell includes a capacitor to store the photocharge of the complementary photodetector and a voltage comparator to compare the capacitor voltage with a preselected reference comparison voltage. The comparator is coupled to an output circuit operable to transmit a signal to the column and row lines when the capacitor voltage is greater than the reference voltage, as determined by the voltage comparator, such that the encoder/decoder circuits generate the address information only when the charge of the photodetector of a particular cell is greater than the predetermined reference voltage.

Accordingly, the image recording sensor according to the invention is built in the states integrated form so that after each measuring cycle only the coordinates of the picture elements that are of interest are supplied directly, whereupon the image recording sensor begins the next measuring cycle. Instead of, as in known image recording sensors, after an image integration period to read out the data of all pixels and then to carry out the object position location with digital image processing methods, the sensor supplies, for such case, a single data word, namely the image element coordinates of the searched objects and can subsequently immediately begin with the next photocharge integration phase. In this procedure, a maximum amount of data reduction is achieved.

In the invention, one-and two-dimensional image recording sensors operating associatively are created, which do not supply intensity values per picture element, but only the addresses of the picture elements that are of interest, i.e., in which the intensity value of the photocharge exceeds a given level. With such image recording sensors having integrated image processing, it is possible to determine directly the picture element speed and the direction of the picture element velocity for one or the lightest picture elements of interest.

The image recording sensor according to the invention is very fast reacting; the reaction speed corresponds in the extreme case to that of discrete detectors. In addition, with the image recording sensor according to the invention, the reaction speed can be adapted to the particular object luminosity.

The image recording sensor according to the invention is produced in accordance with integrated circuit technology. In this manner, the input control circuit and the output circuit can be produced with field effect transistors and gates, in particular with field effect transistors and gates with a multi-gate transistor.

The invention is explained in greater detail with reference to embodiments in conjunction with the drawing, in which:

DETAILED DESCRIPTION

Figure 1:
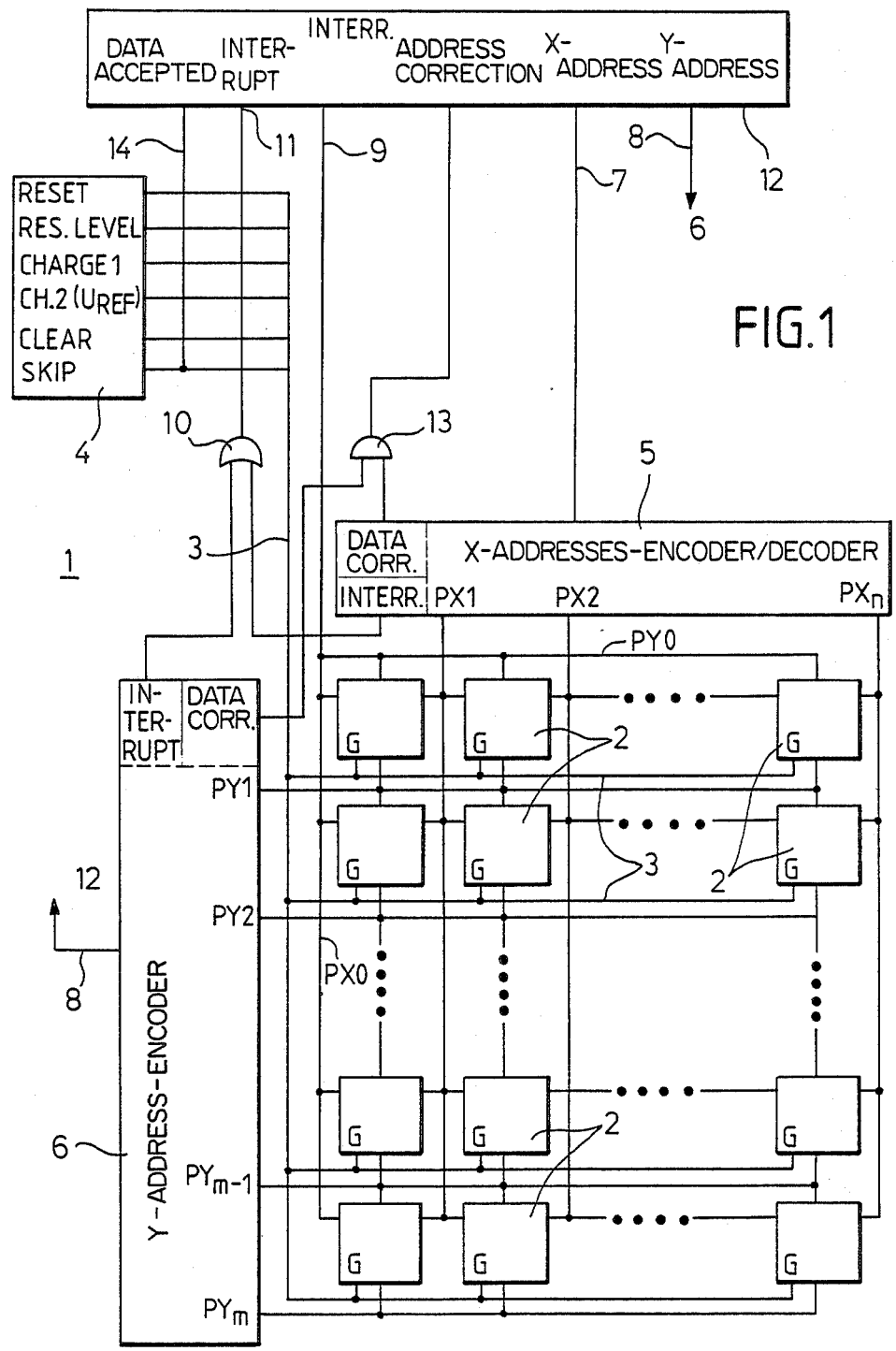
FIG. 1 is a block diagram of an image recording sensor according to the invention including a multitude of cells arranged in a matrix.

An image recording sensor 1 has, in a matrix arrangement of n columns and m rows, a plurality of cells 2, to each of which a photodetector 15 is electrically connected. Each cell has a control input G. All control inputs of the cells are connected via multi-core control line 3 with a common external control circuit 4, which supplies for all cells 2 identical control and check signals. In the represented case they are the signals RESET, RESET LEVEL, CHARGE 1, CHARGE 2 ($U_{REF}$), CLEAR, and SKIP which are discussed in more detail hereinbelow. The image sensor 1 contains further in column direction (n+1) column lines $PX_i$ and in row direction (m+1) row lines $PY_j$, and to which, in each instance, the X-address, $X_i$, and the Y-address, $Y_j$, is assigned. Each cell $2_{i,j}$ is connected with the column lines $PX_{i-1}$ and $PX_i$ as well as with the row lines $PY_{j-1}$ and $PY_j$. The column lines $PX_1$ to $PX_n$ as well as the row lines $PY_1$ to $PY_m$ are connected to an X-address encoder/decoder 5 and a Y-address encoder/decoder 6 respectively, at each output 7, 8 of which the X-address and Y-address of the particular cell is supplied. The column line $PX_0$ and the row line $PY_0$ are combined to provide an interruptenable line 9. For reasons of clarity, the terminals of the cells 2 and the encoder/decoder circuits 5 and 6, are provided with the associated symbols $PX_i$ and $PY_j$.

With the address circuits 5 and 6, a position coding process of cell $2_{i,j}$ is recognized and from it an interrupt signal is generated. These interrupt signals are combined in an OR-gate 10 and transmitted to an interrupt input 11 of a program control circuit 12 for the image evaluation.

Further, in the address circuits 5 and 6, form the bit pattern on row and column lines PX and PY, the binary coordinates of this cell are generated in a position coding access of cell $2_{i,j}$. When these binary coordinates, respectively, position data are complete, the address circuits generate an appropriate output signal, which is combined via an AND gate 13 and supplied to the program control circuit 12. This program control circuit 12 then accepts the address data from the output lines 7 and 8 and transmits to a confirmation output 14 an appropriate signal. This signal is transmitted via the command line SKIP to the cell structure.

Figure 2:
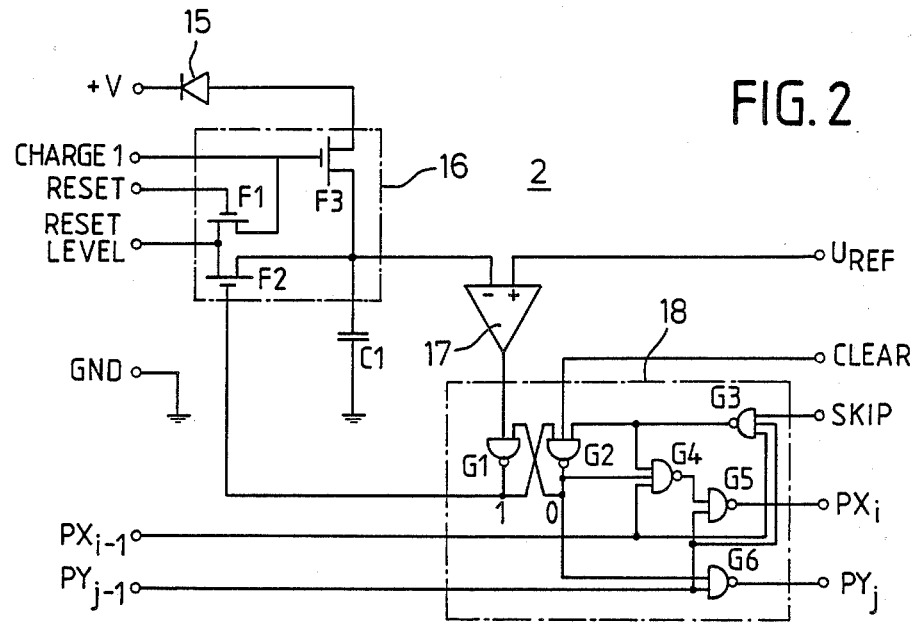
FIG. 2 is a circuit diagram of a cell for an image recording sensor according to the invention.

In FIG. 2 a typical structure of a cell 2 is shown with a photodetector 15 for an image recording sensor with row priority and with a reference voltage $U_{REF}$ for comparing the photocharge of the photodetector 15.

Essential components of the cell are, apart from the photodetector 15, a charging circuit 16 consisting of three field effect transistors F1, F2, and F3 for capacitor C1, further a comparator 17 for comparing the capacitor voltage U1 with a reference voltage $U_{REF}$ as well as a logic interconnection circuit 18 including six gates G1 to G6. The channel of each field effect transistor F1 to F3 becomes conducting when, at the particular gate, a logic ONE or HIGH signal respectively, occurs. At the gate of the field effect transistor F1 the control signal RESET occurs, at the gate of the field effect transistor F3 the control signal CHARGE 1 is applied. At the source electrodes of the field effect transistors F1 and F2 the control signal RESET LEVEL is applied, to the source electrode of the field effect transistor F3 the output signal of the photodetector 15 is transmitted, which, in turn, is connected to a regulated voltage +V. The connection joint of the DRAIN electrodes of the field effect transistors F2 and F3 is connected to a capacitor plate of capacitor C1 as well as to the MINUS input of the comparator 17. The second capacitor plate of capacitor C1 is connected to the ground potential GND which is, in turn, connected to ground.

At the PLUS input of the comparator 17 the reference voltage $U_{REF}$ is applied.

The logic interconnection circuit 18 has, first, two NAND gates G1 and G2 arranged in FLIP-FLOP circuiting with one input of gate G1 being connected with the output of the comparator 17. The second NAND gate has three inputs and the third input can be driven with the control and check signal CLEAR of the external control circuit 4. An input of the third NAND gate G3 is connected to the external control circuit 4 and can be driven by the control and check signal SKIP. The second input of gate G3 is connected to the column line $PX_{i-1}$. This column line is also connected to one input of the NAND gate G4, the second input of which is connected to the output of gate G3. The output line of gate G3 is, in addition, switched to the second input of gate G2. The third control line of gate G4 is connected with the output of NAND gate G2. The input signals for the NAND gate G5 are supplied by the output of gate G4 and by the signal on the row line $PY_{j-1}$. This row line is also connected with one input of gate G6, the other input of which is connected to the output of gate G2. The gates G5 and G6 supply output signals to the column line $PX_i$ as well as the row line $PY_j$. These two gates have an open collector output in order to permit, by mere connection with other outputs, $PX_i$ and $PY_j$ wired or interconnection.

The charging circuit 16 and the logic interconnection circuit 18 are additionally connected through a line between the output of the first NAND gate G1 and the GATE electrode of the field effect transistor F2.

With the cell structure as described, the coordinates of all picture elements can be determined with the image recording sensor, whose intensity, after a given photo charge integration time, exceeds an intensity value given by the reference voltage $U_{REF}$. Further, with this structure, the coordinates of the brightest picture elements or the isohel of picture elements can be determined, which means, picture elements with luminosity within an intensity interval. The progress of this operation will be explained in detail below.

Figure 3:
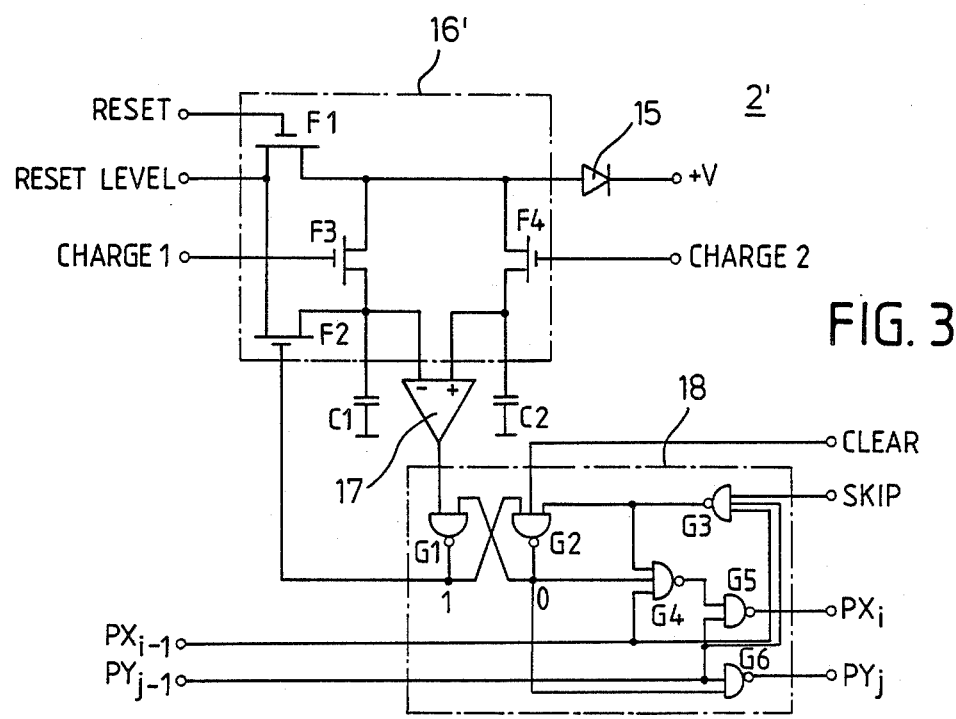
FIG. 3 is a circuit diagram for a further embodiment of a cell for an image recording sensor according to the invention.

In FIG. 3 a typical structure 2' is shown, with which, apart from the above mentioned operations, also performs picture element-intensity comparisons between two images. This cell structure is essentially identical with that according to FIG. 2. The following differences exist:

The charge circuit 16' has an additional field effect transistor F4, the gate electrode of which can be supplied with the control and check signal CHARGE 2 instead of with the reference signal $U_{REF}$. The source and drain electrodes of this field effect transistor F4 are connected to the output of the photodetector 15 and to a second capacitor C2 respectively, the capacitor voltage U2 of which can be compared with that of the first capacitor C1 by the comparator 17.

The function of the charging circuits 16 in FIG. 2 and 16' in FIG. 3, is to direct the photocharge of the photodetector 15 either to the capacitor C1 or both capacitors C1 and C2, as the case may be, or to divert these photocharges unused. In addition, the capacitors C1 and C1 and C2 can be charged or discharged to defined externally suppliable potentials.

The digital logic interconnection circuit 18 between the output signal of the comparator and the column lines PX and the row lines PY permits each cell, to encode on the row and column lines an address code for their position i,j. This takes place, when the cell comparator 17 has determined that either the voltage U1 at the capacitor C1 is greater than the external reference voltage $U_{REF}$ (FIG. 2) or the voltage U1 at the capacitor C1 is greater than the voltage U2 at the capacitor C2 (FIG. 3).

With the logic interconnection circuit 18 in both embodiments assurance is given that at any given time only one cell can encode its position on the column and row lines and the other cells have to wait until this position code has been processed by the horizontal and vertical address circuits 5 and 6 and the address available, at this point in binary form, has been delivered at the address outputs 7 and 8 of the sensor element and has been accepted for further processing. Subsequently, the capacitor C1 of this cell is charged or discharged to a new ground state through the external RESET signal, so that the voltage U1 at this capacitor is again smaller than the reference voltage $U_{REF}$ (FIG. 2) or smaller than the voltage U2 at the capacitor C2 (FIG. 3).

Consequently, the particular cell ends its position coding access to row and column lines PX, PY and another cell can have coding access to these lines if the conditions $U1 > U_{REF}$ (FIG. 2) or $U1 > U2$ (FIG. 3) are given.

The interrrupt conditions $U1 > U_{REF}$ or $U1 > U2$ trigger for the particular cell, an interrupt, recharging of the capacitor C1 to the ground state, in which $U1 < U_{REF}$ or $U1 < U2$ ends the interrupt of the particular cell. This enables the row and column lines for the next interrupt of another cell.

If the interrupt condition is fulfilled in several cells simultaneously, the individual cells trigger their interrupts on the row and column lines in a sequence corresponding to the priority structure given through the logic interconnection circuit 18 between the comparator output signal and row and column lines within each cell. In the cell structure according to FIGS. 2 and 3, the interrupts occur with row priority, that is the first interrupt occurs from the cell with the lowest row number and the lowest column number in the row. Subsequent to this interrupt, the next occurs from a cell within this row with the next highest column number if, in this row another cell is ready for the interrupt. Only when all possible interrupts of this row have been worked through, the possible interrupts from cells of the next row begin.

The image recording sensor according to FIG. 1 contains further the following already mentioned control signals, defined as follows:

INTERRUPT ENABLE

This signal is transmitted to the column and row lines $PX_O$ and $PY_O$. If this signal is NULL then no cells of cell structures according to FIG. 2 and 3 can carry out an interrupt on the row or column lines even if the interrupt condiiton is fulfilled. With an input of this nature interrupt-free photocharge integration periods can be generated. If the signal INTERRUPT ENABLE changes to ONE then from this point on all cells ready for an interrupt proceed to generate their interrupt in a sequence controlled by the above described priority, each next interrupt occurring as soon as a next cell becomes ready to interrupt.

RESET LEVEL

This signal is either an analog input signal, to the voltage value of which the capacitors C1 (FIG. 2) or C1 and C2 (FIG. 3) of each cell can be charged or discharged, or it is the voltage value, against which the photocurrent of the photodetector 15 of a cell is intended to be diverted unused in those time intervals in which no photocharge integration is wanted.

CHARGE 1 AND CHARGE 2

These are digital switching signals to switch the charge flow from or to the capacitors C1 or C2 on or off and the charge flowing through the field effect transistors F3 or F4 can be either the photocharge of photodetector 15 or the compensating charge from the capacitors in order to reach the potential which is given by the signal RESET LEVEL.

RESET

With this digital control and check signal, in connection with the signals CHARGE 1 and CHARGE 2, the following five functions can be carried out on the cell structures according to FIG. 2 and 3:

(a) charging or discharging the capacitors C1 of all cells to the potential corresponding to the signal RESET LEVEL. For this to occur the control and check signals are CHARGE 1=1, CHARGE 2=0 AND RESET=1.

(b) charging or discharging the capacitors C2 of all cells to the potential determined by signal RESET LEVEL with the remaining control signals CHARGE 2=1, CHARGE 1=0 and RESET=1.

(c) diverting the photodetector charges in times, during which no integration of the photocurrent in one of the capacitors C1 or C2 is intended to take place. Here, the control signals CHARGE 1=0, CHARGE 2=0 and RESET=1.

(d) integrating the photodetector charges in the capacitor C1. Here CHARGE 1=1, CHARGE 2=0 and RESET=0.

(e) integration of the photodetector charges in the capacitor C2 at CHARGE 1=0, CHARGE 2=1 AND RESET=0.

SKIP

In a cell structure according to one of FIG. 2 or FIG. 3, the digital switching signal SKIP=1 causes individual interrupts to be skipped. Here, with SKIP=1, the signal interrupt level must be smaller than the signal $U_{REF}$ (FIG. 2) or smaller than U2 (FIG. 3).

CLEAR

This digital control and check signal permits at input IS HIGH address coding with address output of the cells and respectively ends or blocks them when input IS LOW. (Below, overlining of CLEAR will be omitted).

In order to code the coordinates x and y of a cell $2_{x,y}$ which at this point carries out an interrupt on the row and column lines, the logic states of row and column lines are defined in the following way:

$$PY_j = \begin{cases} 1 \text{ for } j < y \\ 0 \text{ for } j \geq y \end{cases}$$

In rows $j \geq y$, in addition, all address outputs of the cells connected to the column lines $PX_i$, which are the open collector outputs of gates G5 in the logic interconnection circuits 18, are switched to logic state ONE. Thus, it applies that $$PX_i = \begin{cases} 1 \text{ for } i < x \\ 0 \text{ for } i \geq x \end{cases}$$

Instead of the open collector outputs, high-impedance tristate outputs can also be used here. From this coding with address circuits 5, 6 it is possible to determine the address of the particular interrupt cell with the coordinates x and y.

Below, four application samples A, B, C, and D with the particular procedure steps will be given, which can be carried out with the described image recording sensor.

(A) Determination of the coordinates of all picture elements the intensity of which after a given photocharge integration time t has exceeded a given intensity value $U_{REF}$ For this application a cell structure in accordance with FIG. 2 is used. The following steps in the procedure must be followed:

1. Discharge of capacitors C1 of all cells to a starting value, for example the black level given by the signal RESET LEVEL, and this analog signal is smaller than the given intensity value $U_{REF}$. The remaining control and check signals are CHARGE 1=1, RESET=1, CLEAR=0 and INTERRUPT ENABLE=0.

2. Integration of the photocharge of the photodetector during the interval t in the capacitors C1 of the cells with CHARGE 1=1, RESET=0, INTERRUPT ENABLE=0, and CLEAR=1. Through integration of the photocharge the potential increases at the capacitors C1. The photocharge integration does not need to take place during the entire interval t; this integration can be interrupted any number of times through intervals Δt by setting CHARGE 1=0, RESET=1, INTERRUPT ENABLE=0, and CLEAR=1.

3. Upon input of signals INTERRUPT ENABLE=1 and CLEAR=1 interrupts are triggered by all cells, in which the interrupt condition $U1>U_{REF}$ is given. Through priority control with the logic interconnection circuit 18 the picture element coordinates of these cells are output. If no further photocharge integration is desired during the cell interrupts, CHARGE 1=0 and RESET=1 is set, otherwise CHARGE 1=1 and RESET=0. In the first case the photocharges of the photodetectors are diverted unused, in the second case they are fed via the channel of the field effect transistor F 3 to the capacitor C1.

4. If no further interrupts are desired, the address output driven by the interrupts can be ended at any time by setting CLEAR=0.

5. Return to procedure step 1, whereby a new measuring cycle is initiated, either after all cells have output their image coordinates or after, with CLEAR=0 and SKIP=1, part of the measuring cycle has been skipped.

(B) Determining the coordinates of the brightest picture element

For this operation too, a cell structure according to FIG. 2 is used. The progression of the function is characterized by the following steps:

1. Discharge of capacitor C1 of all cells to the starting value corresponding to step 1 in the above described application example A.

2. Integration of the photocharges in the capacitors C1 with the control signal INTERRUPT ENABLE=1, otherwise, however, the same control and check signals as above in step 2 of example A. Through INTERRUPT ENABLE=1 an interrupt occurs at the point, at which the interrupt condition $U1>U_{REF}$ is fulfilled by a first cell. After output of the coordinates of this cell, capacitor C1 is reset to the starting value, which is determined by RESET LEVEL, in addition the interrupt is cancelled. In this manner, the cell with the brightest picture element is determined. The integration can now either be continued for determining the coordinates of the second and third brightest picture element, etc. or it can be started over again by returning to procedure step 1.

In this application too, the photocharge integration can, of course, also be interrupted by intervals any number of times.

(C) Determining isohel-picture element coordinates

In this example also a cell structure according to FIG. 2 is used.

In some applications only the coordinates of picture elements of approximately the same luminosity are needed, the luminosity of which lies in an intensity interval $I_{min}<I<I_{max}$. The procedural steps are the following:

1. At first the capacitors C1 of all cells are discharged to the starting value. This step is again the same as in the application example A.

2. The photocharge of the photodetectors is integrated in the capacitors C1 corresponding to step 2 in example A and the photocharge integration can again be interrupted as many times as desired by intervals.

3. To generate intervals in the desired intensity interval initially all interrupts are cleared, for which $I>I_{max}$ is true. This takes place by setting CHARGE 1=0, RESET=1.

INTERRUPT ENABLE=0, $U_{REF}=I_{MAX}$ and CLEAR=0. Subsequently all interrupts within the desired intensity interval are cleared through CLEAR=1, CHARGE 1=0, RESET=1, INTERRUPT ENABLE=1 AND $U_{REF}=I_{MIN}$.

The output of cell addresses which carry out their interrupts can, again, be ended at any time by setting CLEAR=0, and a new measuring cycle can be begun by returning to step 1. Likewise, it is possible to determine the picture elements in various intensity intervals by multiple repetition of step 3.

(D) Image comparison for determining the coordinates of picture elements, the intensity value of which has changed over time In this application a cell structure according to FIG. 3 has been used, with which it is possible to carry out intensity comparisons between picture elements of two images, the picture element intensity values of which is stored in the capacitors C1 and C2. The steps in the function, here, are the following:

1. Discharging the capacitors C1 and C2 of all cells to a starting value, for example the black level, which, again, is determined by the signal RESET LEVEL. Here, CLEAR=0, CHARGE 1=1, CHARGE 2=1, RESET=1, and INTERRUPT ENABLE =0.

2. Integrating the picture element intensities in the first image, which is stored in the capacitors C1, and, in particular, during a time interval t1. Here, resembling the procedure step 2 in the application example A CHARGE 1=1, CHARGE 2=0, RESET=0, INTERRUPT ENABLE=0 and CLEAR=1. The time interval t1 can be interrupted as many times as needed through partial intervals by setting CHARGE 1=0.

3. Integrating the picture element intensities of the second image, which is stored in the capacitors C2, during time interval t2. Here, accordingly CHARGE 1=0, CHARGE 2=1, RESET=0, INTERRUPT ENABLE=0, and CLEAR=1.

The time interval t2 can also be interrupted through partial intervals any number of times by setting now CHARGE 2=0.

The partial intervals of intervals t1 and t2, of course, cannot be overlapping interlocked.

It is, of course, also possible, to store the first image in the capacitors C2 and the second image in the capacitors C1. The control and check signals CHARGE 1 and CHARGE 2 must, in that case be correspondingly exchanged.

4. Subsequently, a picture element comparison is carried out, for which CHARGE 1=0, CHARGE 2=0, RESET=1, and CLEAR=1 are set. As a consequence of this setting all cells, whose integrated picture element intensity in interval t1 was greater than (or possibly smaller) than in interval t2, trigger an interrupt and deliver their picture element coordinates. These are new coordinates or, possibly, old coordinates determined in a preceding measuring cycle of bright or dark moving objects reproduced on the image recording sensor. The output of these image coordinates can again be ended any time by inputting CLEAR=0.

5. By comparing the results of several of sequential image comparisons the speed and the direction of a moving object represented on the image recording sensor can be determined.

Figure 4:
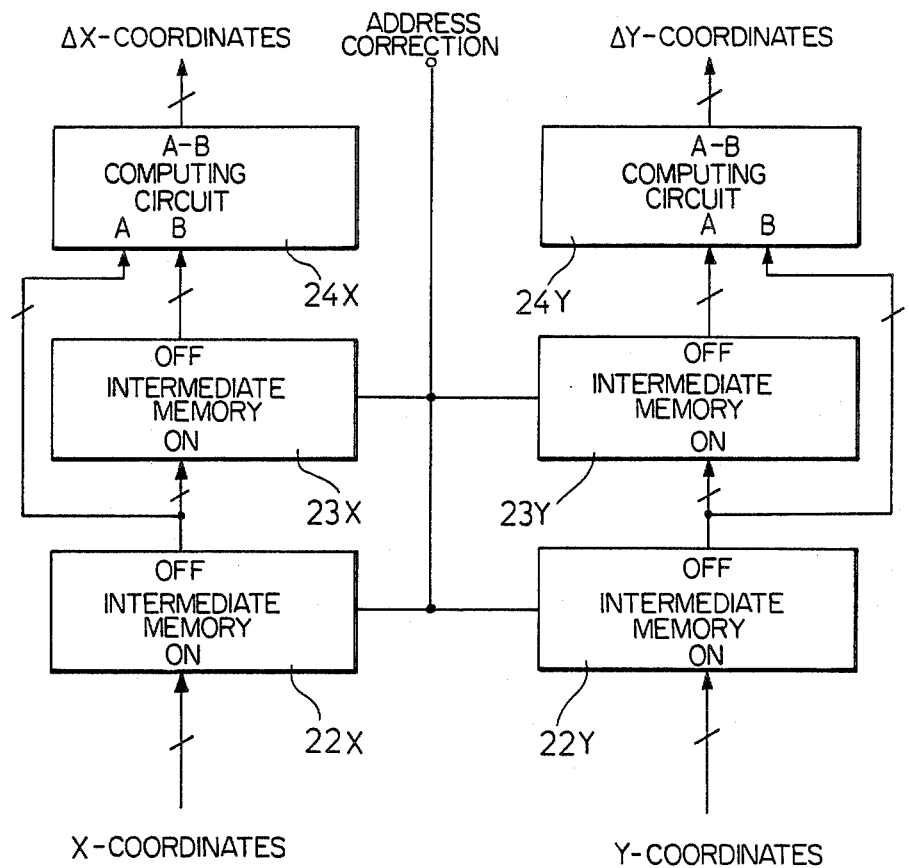
FIG. 4 is a block diagram of an accessory device for an image recording sensor according to the invention for calculating the relative image element speeds of the objects to be recognized.

In an external memory or computing circuit 21, the sequential picture element coordinates output by the image recording sensor are compared. This memory and computing circuit 21, shown schematically in FIG. 4, has for the x-coordinates and y-coordinates corresponding to the cell coordinates first self-holding memory circuits 22X, 22Y. Their outputs are connected with further memory circuits 23X, 23Y. The output signals of the first memory circuits 22X, 22Y are supplied to inputs of computing circuits 24X, 24Y, respectively. To the second input, in each instance, the output signal of the memory circuits 23X, 23Y are transmitted, respectively. The represented memory and computing circuit is, thus, essentially a subtracting stage with intermediate storage devices, in which at known or fixed pre-set measuring time intervals, the intermediated storage device compares sequential coordinate values with each other. At the outputs of the computing circuits 24X, 24Y signals are present directly corresponding to the speed and the directional velocity of the missile.

From the description of the individual examples it is evident that the reaction time of the image recording sensor according to the invention is significantly shorter than that of known image recording sensors, since through appropriate control only the picture elements of image areas of interest are output. In the last described application example, the reaction time of the image recording sensor in object position determination corresponds to the absolute shortest possible reaction time and corresponds to that of a discrete photodetector element.

What is claimed is:

1. An image recording sensor including a preselected line-shaped pattern of photodetectors for recording an image, said photodetectors being coupled to an image processing circuit, which image recording sensor comprises:
   at least one part of said image processing circuit comprising a plurality of discrete circuit cells;
   each of said discrete circuit cells being electrically coupled to a complementary one of said photodetectors;
   said plurality of discrete circuit cells being coupled to an address circuit means operable to generate electrical signals which selectively define an address for each of said discrete circuit cells;
   each of said discrete circuit cells including:
   an input control circuit for receiving external control signals to selectively activate and control said cell;
   a capacitor for accepting the photocharge of said complementary one of said photodetectors;
   a voltage comparator operable to compare the voltage of said capacitor with a comparison voltage; and
   an output circuit coupled to said voltage comparator and operable when the voltage of said capacitor is greater than said comparison voltage to transmit a signal to said address circuit means to thereby generate an electrical signal representative of the address of said cell.

2. The image recording sensor of claim 1, wherein said discrete circuit cells comprise integrated electronic circuits.

3. The image recording sensor of claim 1 wherein said address circuit means comprises column and row lines electrically coupled to said photodetectors.

4. The image recording sensor of claim 3 wherein said column and row lines are electrically coupled to address encoder/decoder circuits operable to generate electrical signals representative of cell addresses.

5. The image recording sensor of claim 1 wherein said input control circuit includes a charging circuit operable to control the charging and discharging of said capacitor through execution of said external control signals.

6. The image recording sensor of either of claims 1 or 5 wherein said comparison voltage is an externally applied reference voltage.

7. The image recording sensor of claim 5 wherein each of said discrete circuit cells includes a second capacitor coupled to said charging circuit, the comparison voltage comprising the voltage across said second capacitor.

8. The image recording sensor of either of claims 1 or 5 wherein said output circuit comprises a logic interconnection circuit operable to prioritize transmission of a signal from said discrete circuit cell to said address circuit means relative to the transmission of signals by other ones of said discrete circuit cells.

9. The image recording sensor of either of claims 1 or 5 and further an external control circuit coupled to said address circuit means and operable with said address circuit means to interrupt other ones of said discrete circuit cells when the voltage of the capacitor of a first one of said discrete circuit cells is greater than said comparison voltage and said first one of said discrete circuit cells transmits a signal to said address circuit means

* * * * *